(No Model.)
R. J. GILMORE.
BUTTON FASTENER.
No. 281,992.          Patented July 24, 1883.
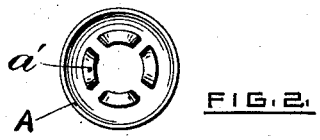
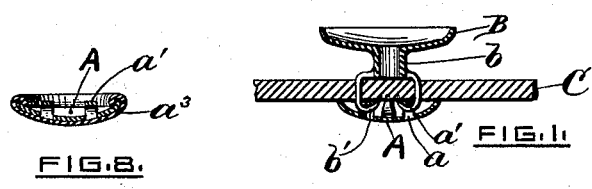
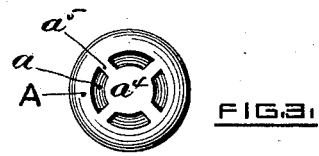
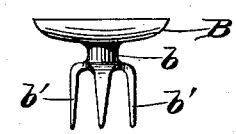
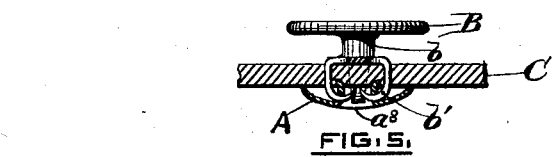
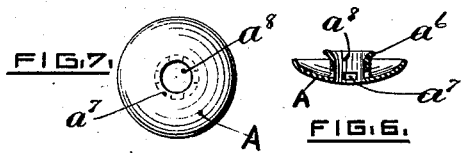
WITNESSES:                                                           INVENTOR:
Charles Hannigan
Frank B. Graters                    Robert J. Gilmore.
                                                         BY Geo. H. Remington, atty.

UNITED STATES PATENT OFFICE.

ROBERT J. GILMORE, OF PROVIDENCE, ASSIGNOR TO PRESTON L. BELDEN, OF NORTH PROVIDENCE, RHODE ISLAND.

BUTTON-FASTENER.

SPECIFICATION forming part of Letters Patent No. 281,992, dated July 24, 1883.

Application filed May 29, 1883. (No model.)

*To all whom it may concern:*

Be it known that I, ROBERT J. GILMORE, a citizen of the United States, residing at Providence, in the county of Providence and State of Rhode Island, have invented certain new and useful Improvements in Attaching Buttons to Garments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to certain improvements in attaching buttons to garments, &c.; and it consists, essentially, of a concavo-convex disk or washer provided with a series of bridges or indentations, thereby allowing the prongs of a button to be deflected and pass through the openings formed by said bridges. My invention or disk is also adapted to be covered with cloth or fabric upon its outer or convex surface, all as will be more fully hereinafter set forth.

In the accompanying drawings, made enlarged, Figure 1 represents a central section through a pronged button and my improved concavo-convex prong-deflecting disk, showing a button completely attached to a fabric. Fig. 2 represents a top view of the disk. Fig. 3 represents an inverted view of the same. Fig. 4 represents an ordinary garment-button provided with shank and prongs. Fig. 5 represents, in central section, a modification of my improved disk, showing a button and fabric secured together therewith. Fig. 6 represents a sectional view of the modified disk, consisting of the concavo-convex deflecting disk provided with a tubular shank having a series of openings therein. Fig. 7 represents an inverted plan view of the same. Fig. 8 represents, in central section, my improved concavo-convex disk covered with cloth or other analogous material.

Again referring to the drawings, A represents the concavo-convex prong-deflecting disk, made from suitable material and provided with a series of raised projections or bridges, $a'$, which latter are punched or swaged from the outer or convex surface of the disk, but at the same time being integral with the disk, as shown at $a^5$, Fig. 3, thereby leaving spaces or openings $a$ between the under surface of said bridges and the inner or concave surface of the disk.

B represents a suspender or garment button provided with a shank, $b$, and attaching-prongs $b'$, which latter are adapted to be deflected inwardly and through the openings $a$ of the disk.

A, Figs. 5, 6, and 7, represents a modification of my improved prong-deflecting disk, and provided with a central tubular shank, $a^8$, projecting from the upper or concave surface of the disk, said shank being provided with a series of openings, $a^7$, which are adapted to receive the prongs $b'$ of a button.

The process of making my improved disk is not deemed essential herewith, as it can be punched or stamped out in any well-known manner.

Another advantage of my improved disk consists in having its outer surface smooth, whereby it can be covered with cloth, the surfaces $a^4$ and $a^5$ thereof (Fig. 3) preventing the cloth from getting into the openings $a$, with its attendant annoyance. Such covered disks also present a very smooth and neat appearance, as when attached to the garment the clinched prongs $b'$ are not visible.

The manner of attaching buttons to garments, in connection with my improved prong-deflecting disk, is not materially different from that employed for similar buttons. The prongs $b'$ of a button, B, are inserted through the fabric or garment C and the washer A placed relatively with the button, the prongs resting upon the concave surface of the disk and outside the bridges $a'$ or tube $a^8$, after which the parts A and B are forced or pressed together by suitable means, which motion causes the prongs to be deflected below the bridges $a'$ and through the openings $a$, thereby completely securing the button to the garment, as shown.

Having thus described my invention, what I claim as new, and desire to secure by Letters Patent, is—

1. The combination, with a button having attaching prongs, of a concavo-convex metallic disk, provided with a series of openings and bridges upon its concave face, adapted to receive the ends of the prongs and deflect them inwardly, substantially as set forth.

2. In a button-attaching device, the concavo-convex disk or washer A, provided with a series of bridges, $a'$, openings $a$, and further provided externally with the central surface, $a^4$, and ties $a^5$, substantially as shown and described.

3. The concavo-convex disk A, provided on its concave surface with the central tube, $a^8$, the latter having a series of openings, $a^7$, therein, the whole adapted to deflect and receive the prongs of a button, substantially as shown and set forth.

In testimony whereof I have affixed my signature in presence of two witnesses.

ROBT. J. GILMORE.

Witnesses:
GEO. H. REMINGTON,
CHARLES HANNIGAN.